Hugo Bilgram's,
Improvement in Speed Governors.
No. 118,332.          Patented Aug. 22, 1871.
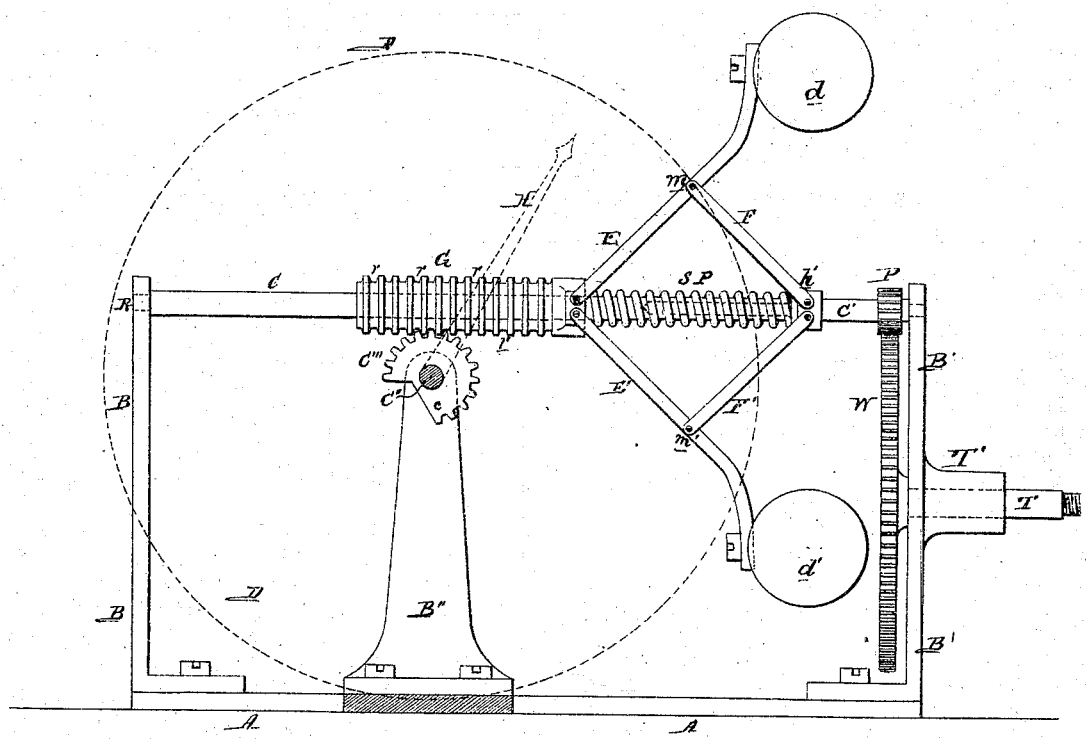
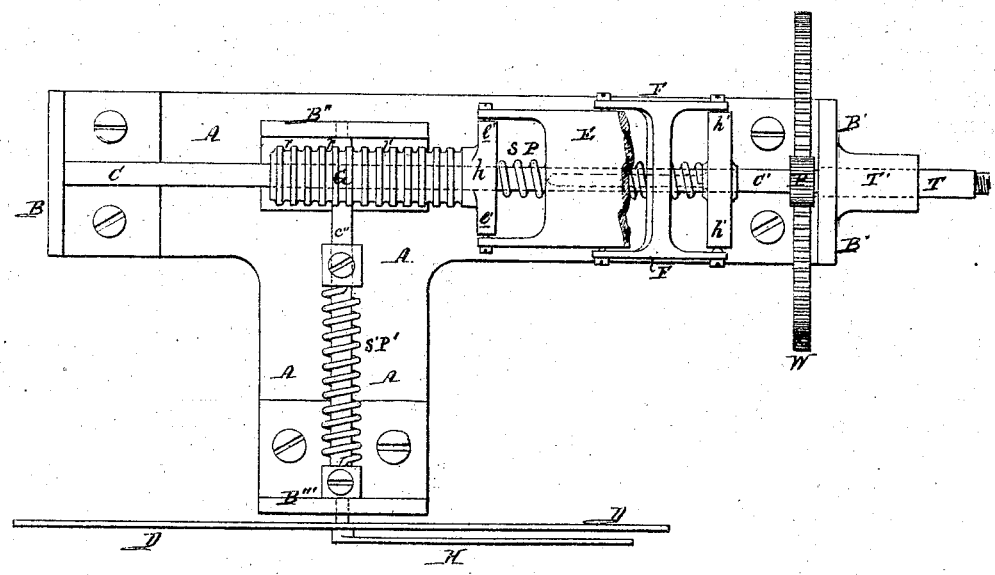
Witnesses
Wm A Steel
John Parker
H Bilgram
By his atty's
Howson & Son

UNITED STATES PATENT OFFICE.

HUGO BILGRAM, OF PHILADELPHIA, PENNSYLVANIA.

IMPROVEMENT IN SPEED-INDICATORS.

Specification forming part of Letters Patent No. 118,332, dated August 22, 1871.

*To all whom it may concern:*

Be it known that I, HUGO BILGRAM, of Philadelphia, county of Philadelphia, State of Pennsylvania, have invented an Improved Speed-Indicator, of which the following is a specification:

My invention consists in a speed-indicator, in which the sleeve, operated by the revolving weighted arms, instead of being secured to or forming part of the rotating shaft to which said arms are hung, is arranged to revolve and slide on a stationary spindle, the apparatus being thereby rendered much more sensitive.

Figure 1 is a side view of my improved speed-indicator, and Fig. 2 a plan view.

The frame-work of the indicator consists in the present instance of the base-plate A and standards B, B′, B″, and B‴. C is a stationary spindle, having one end secured to the standard B, the opposite end being hollow, for the reception of a portion of the spindle C′, the outer end of which is arranged to turn in the standard B′. To a cross-piece, $h'$, on the revolving spindle C′, are hinged two links F F′, one of which is secured to a weighted arm, E, and the other to a like weighted arm, E′, the two arms being connected to a sleeve, G, which is arranged to turn and slide freely on the stationary spindle C. On this sleeve is made a series of annular ribs, so as to form a cylindrical rack, adapted to the teeth of a segment or wheel C‴, on a spindle, C″, which is arranged to turn in the standards B″ and B‴, and which is furnished at its outer end with a pointer, H, adjacent to a circular index plate, D, secured to the frame. A spiral spring, S P, surrounds the stationary spindle C, between the cross-piece on the spindle C′ and the sleeve G, and tends to move the weighted arms E and E′ toward the spindle, and to resist the outward movement of these arms, caused by centrifugal force, when they revolve. A spiral spring, S′ P′, also surrounds the spindle C″, one end of the spring being attached to the said spindle, and the other to the standard B‴, the object of this spring being to insure the steady action of the pointer by preventing lost motion in the spindle, which might occur, owing to the want of accuracy, in the fitting of the circular rack to the teeth of the wheel.

In speed-indicators of the usual construction, the sleeve G′ slides on or forms a part of a revolving spindle, and practical tests show that with this arrangement a certain amount of power must accumulate before the sleeve is moved longitudinally, so that the pointer traverses the index-plate with an irregular motion, jumping from one graduation to another. Numerous experiments with my improved indicator show that the substitution of a stationary for a rotating spindle results in imparting such sensitiveness to the mechanism that the slightest variation in speed changes the longitudinal position of the sleeve, as indicated by the steady movement of the pointer over the index-plates without the usual jerks.

I claim—

A speed-indicator, in which a sleeve, G′, operated by the revolving weighted arms E E′ and spring S P, is arranged to both revolve and slide on a stationary spindle, C, all as and for the purpose described.

In testimony whereof I have signed my name to this specification in the presence of two subscribing witnesses.

HUGO BILGRAM.

Witnesses:
WM. A. STEEL,
JNO. B. HARDING.